Fig. 6    Fig. 7    Fig. 8
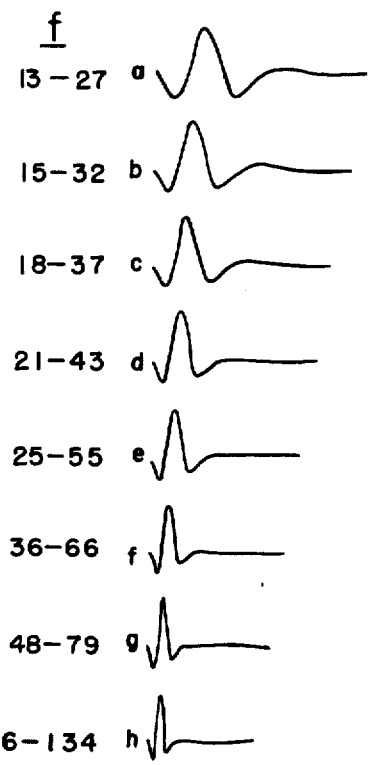
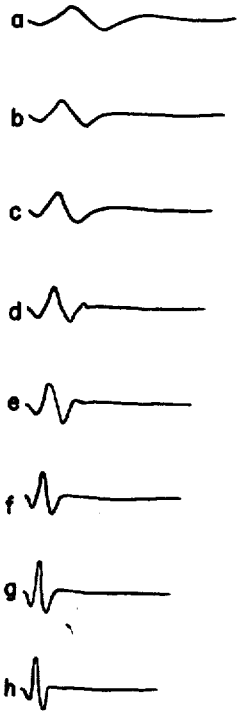
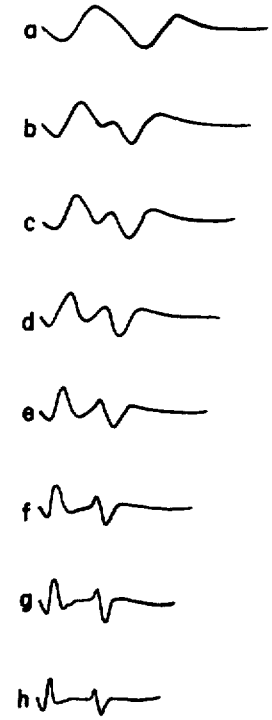
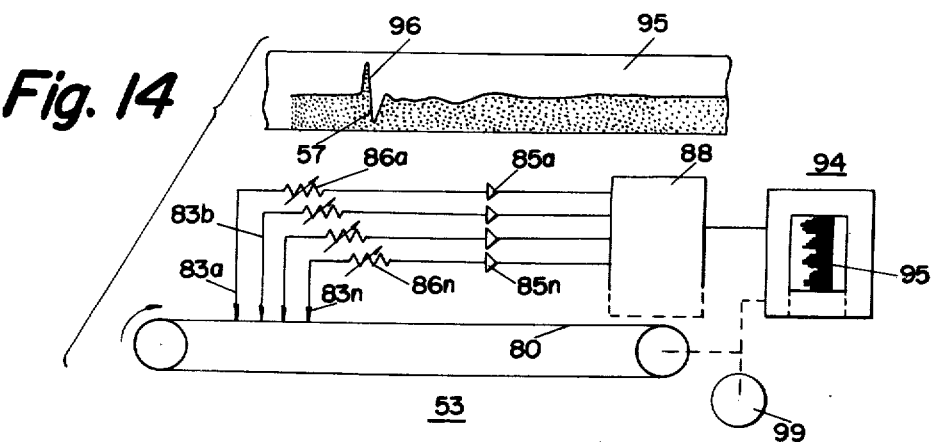
Fig. 14

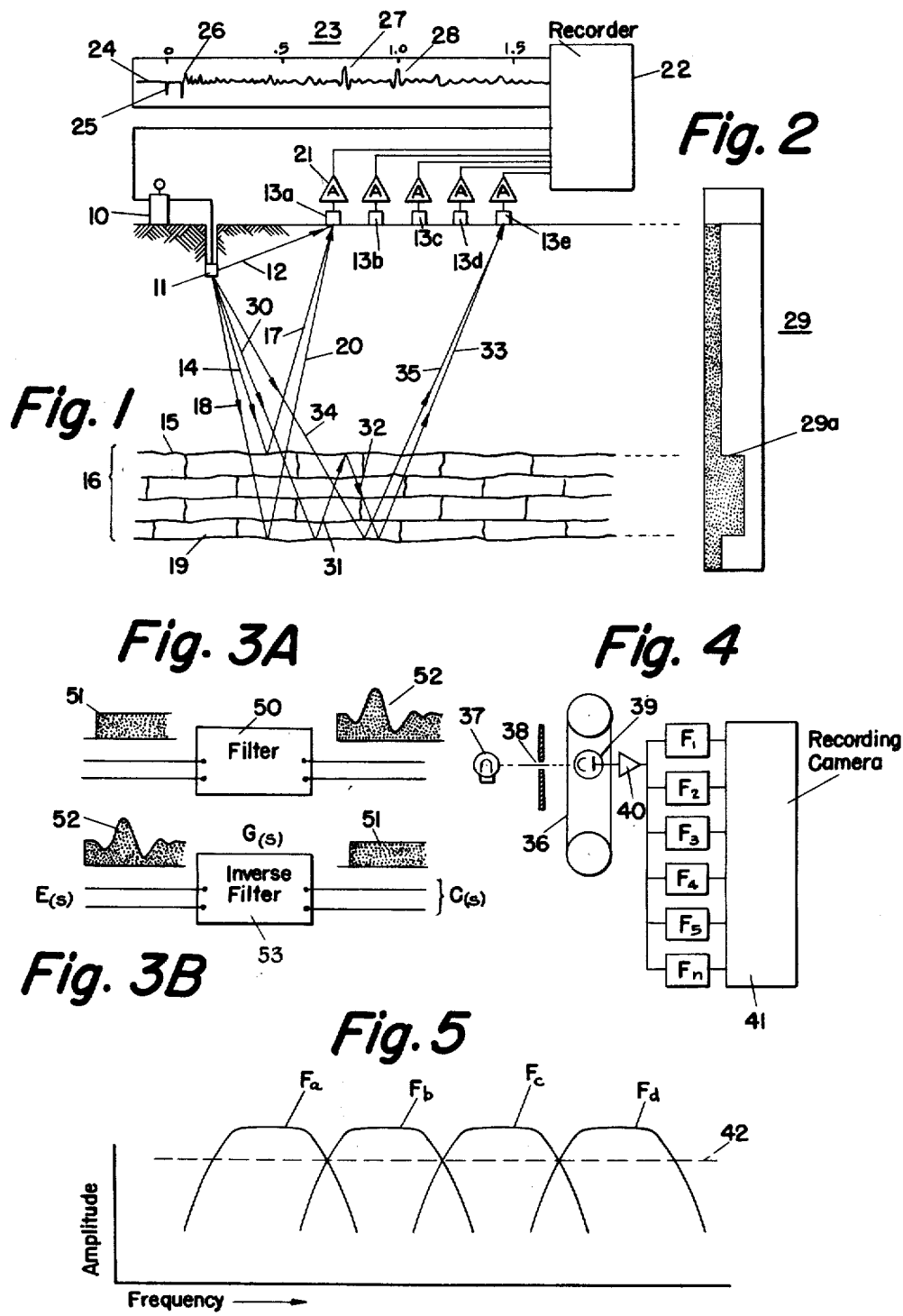

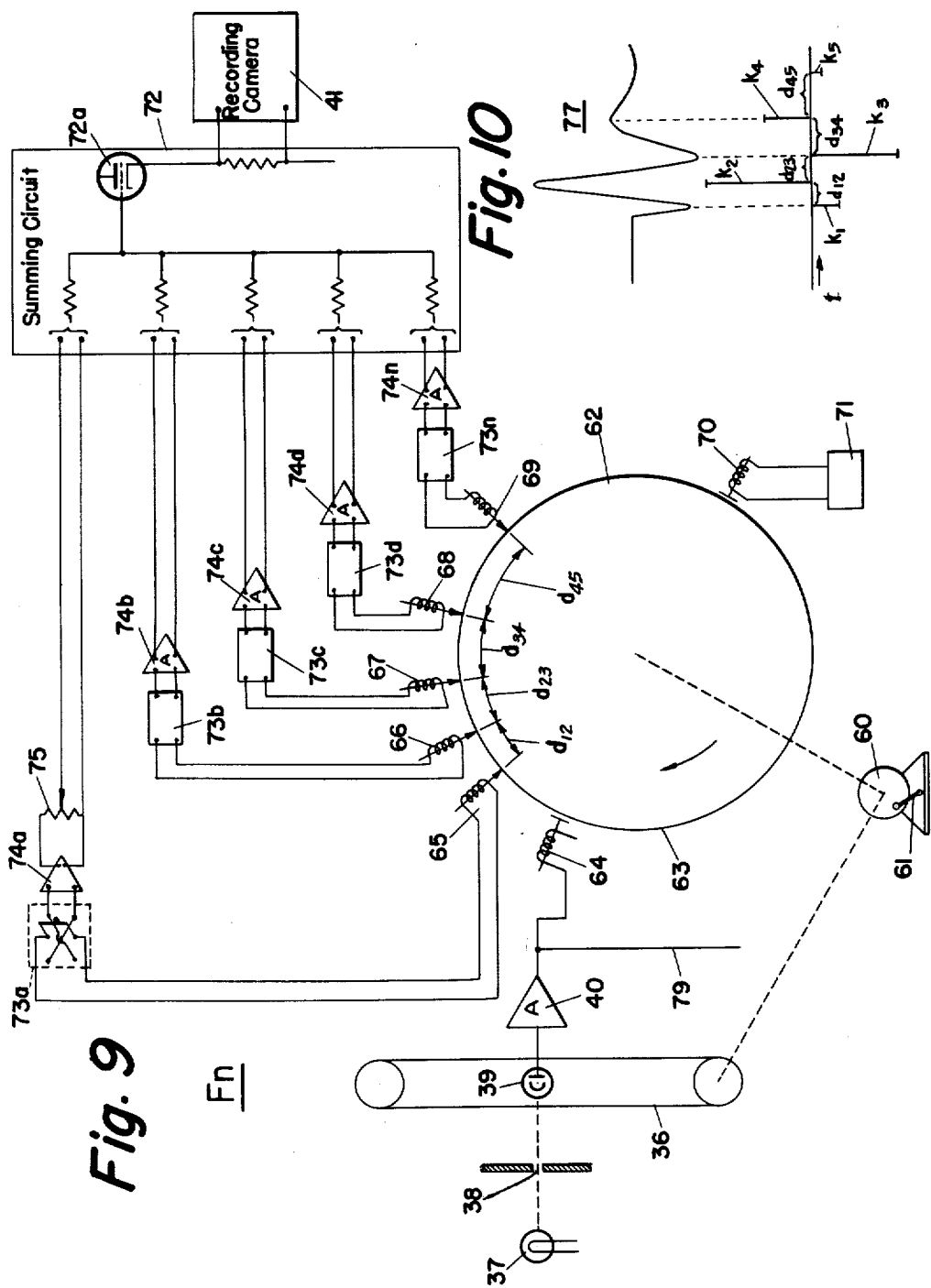

Jan. 29, 1963   P. L. LAWRENCE ETAL   3,076,177
ELIMINATION OF INSTRUMENTATION DISTORTION
Filed June 27, 1957   5 Sheets-Sheet 4

United States Patent Office 3,076,177
Patented Jan. 29, 1963

3,076,177
ELIMINATION OF INSTRUMENTATION
DISTORTION
Philip L. Lawrence, Dallas, and Manus R. Foster, Irving, Tex., assignors, by mesne assignments, to Socony Mobil Oil Company, Inc., New York, N.Y., a corporation of New York
Filed June 27, 1957, Ser. No. 668,569
13 Claims. (Cl. 340—15.5)

This invention relates to methods of and systems for extending the usefulness of geophysical data available in phonographically reproducible form or in the more conventional form of visual records and, more particularly, methods involving use of a system having an impulse response, the inverse of one corresponding with that of the system employed to provide such data.

This application is a continuation-in-part of applicants' prior application Serial No. 617,552, filed October 22, 1956, now abandoned.

An object of the present invention is to provide methods of and means for obtaining from conventional geophysical data more accurate and definitive identification of the lithology of subsurface strata which give rise to anomalous waves or signals. While the invention will be found applicable to the treatment of several different and distinctive forms or types of geophysical methods, the following description will deal primarily with seismic exploration, following which will be shown the application to other methods of geophysical exploration.

In accordance with one aspect of the invention, there is explicitly identified in a field seismogram at least one waveform or pulse which is representative at the recording means of the input function.

In accordance with a further object of the invention, the aforesaid input function, the uniquely identified wavelet, is utilized for the conversion of the seismic information on the seismogram from its coordinates of amplitude and time to coordinates representative of formation velocity and time.

More particularly, in accordance with a further object of the invention, the seismic data, i.e., a seismogram as a whole, is converted to a function representative of velocity contrast, free of frequency distortion, with a time base related to that of the field seismogram.

Yet another object of the invention is to produce from primary geophysical data, as for example a field seismogram, a record representative throughout the depth of earth penetrated by the seismic waves of the formation velocity characteristics of the same nature and character as that obtained by continuous well logging velocity surveys.

In carrying out the invention in one form thereof, geophysical data is obtained employing a first system. A second system is then employed to which said data is applied wherein the second system has an impulse response the inverse of one corresponding with the first system in order to provide a graphical representation of the physical characteristics upon which such data is primarily dependent and free from distortions introduced by the instrumentalities employed.

In carrying out the invention in one form thereof, there are selected from a reproducible field seismogram one or more reflections of distinctive character which are in succession passed through a plurality of similar filters of equal band width but differing pass bands, by means of which filters there is more explicitly identified the velocity character of a subsurface bed accounting for the selected waveform. In this manner, there is determined for an input function a waveform having a known relation to the waveform in a velocity log due to the same or like subsurface strata. The waveform selected is one produced after travel of seismic energy through the earth from the point of origin, reflection from the selected bed to the geophone, and after passage of the resultant output signal from the geophone through the filtering and amplifying apparatus to the recorder. Having determined an input function, there is then utilized an inverse filter which produces from the input function an output function indicative or representative of velocity layering. Signals representative of the seismogram as a whole are applied to the inverse filter for production of data, preferably in the form of a record, corresponding with the formation velocity of the earth traversed by the seismic energy. This data is immediately useful for interpretation of field seismograms.

In further carrying out the present invention, a seismogram of the kind normally taken in the field is converted to a velocity log which by the character of the record thereof corresponds with incremental velocity logs which would be obtained had a well bore been available in the area over which the conventional seismogram was obtained. The conversion of a conventional seismogram to a record corresponding with that of a continuous velocity log is accomplished by transforming an electrical signal, representative of a single pulse for a selected portion of the seismogram which uniquely arises from or identifies a subsurface velocity feature of known character, to one identical with the subsurface velocity feature as appearing in the velocity log. After this transformation has been accomplished, the same transformation is made with respect to the seismogram as a whole to produce therefrom a velocity log of the entire subsurface depth covered by the seismogram.

In one form of the invention, the seismogram is converted to a velocity log by means including a time-domain filter to which are applied one or more electrical signals representative of the unique and known subsurface velocity feature as appearing on the seismogram. The filter is adjusted for transformation of the selected unique electrical signal to an output signal which substantially corresponds with the unique subsurface velocity feature as it would appear on a velocity log. While identity as between the output signal from the filter and that representative in a velocity log of the distinctive subsurface layer is the ultimate objective in accordance with the invention, it is to be understood that useful velocity logs can be obtained without exact correspondence between the output signal of the filter and that obtained in the field. The usefulness of such velocity records where borehole logs of velocity are not available will be recognized when it is realized that, with the limitations known in advance, the converted log is a far more useful interpretative tool than the original record.

In another form of the invention, a seismogram is converted to a velocity log by means of a time-domain inverse filter to which there are applied electrical signals representative of the seismogram. The inverse filter is characterized by an impulse response which is the inverse of an impulse response represented by the initial signal or uphole signal appearing on the seismogram.

For a discussion of additional background theory, a more complete understanding of the present invention, and for further objects and advantages thereof, reference may now be had to the following description taken in conjunction with the accompanying drawings, in which:

FIG. 1 illustrates a seismic exploring system;

FIG. 2 is an idealized velocity log of the lithology illustrated in FIG. 1;

Figure 11:
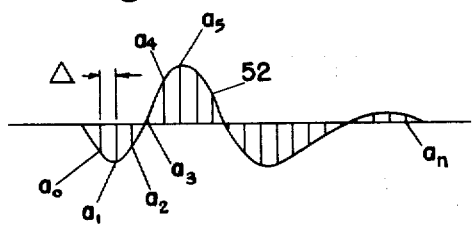
Figure 12:
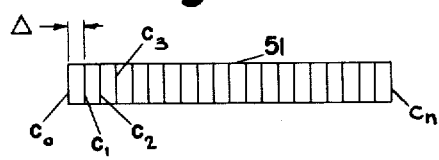
Figure 13:
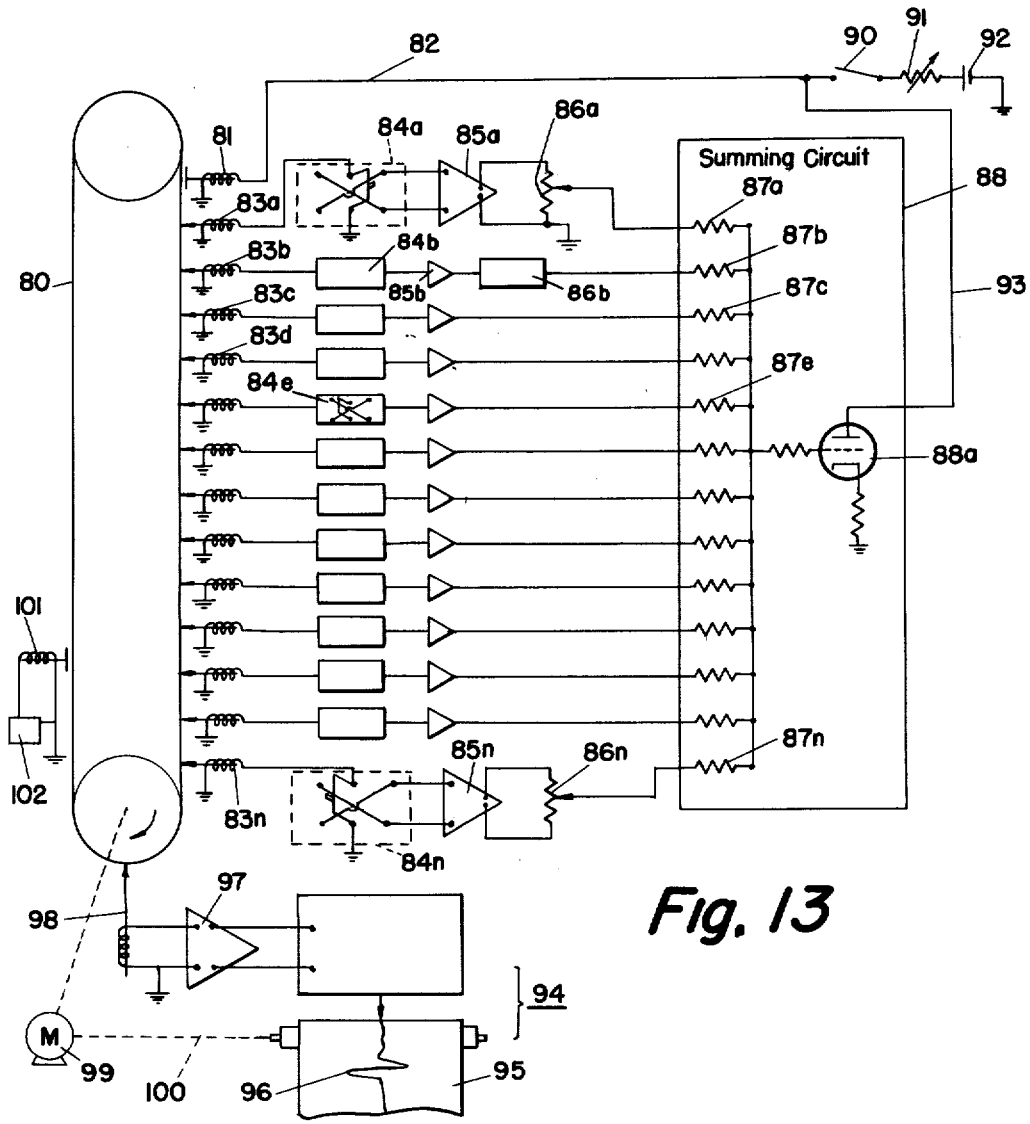
Figures 15, 16:
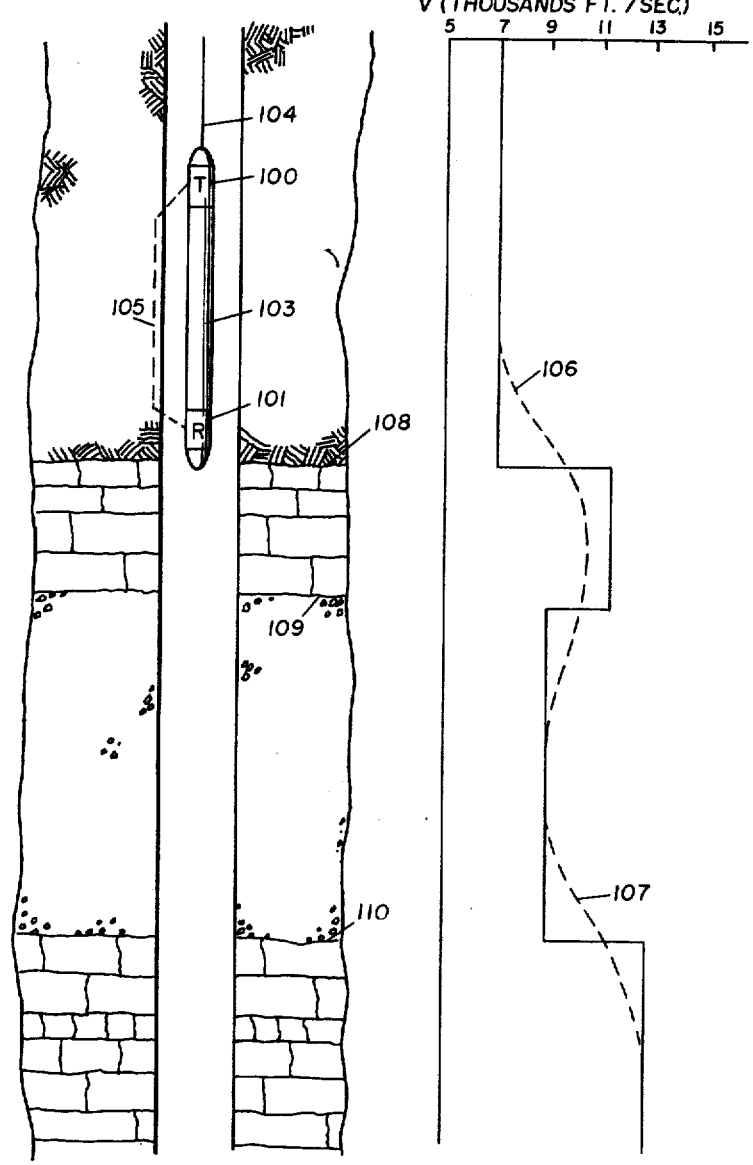

FIGS. 3A and 3B diagrammatically illustrate, respectively, a conventional filtering system and an inverse filtering system;

FIG. 4 diagrammatically illustrates a multiple filtering system;

FIG. 5 in idealized form represents the attenuation characteristics of the filters of FIG. 4;

FIGS. 6, 7, and 8 illustrate waveforms at the outputs of the filters of FIG. 4 for three different input signals;

FIG. 9 diagrammatically illustrates a time-domain filter;

FIG. 10 includes a waveform and associated diagram;

FIGS. 11 and 12 illustrate, respectively, a waveform uniquely identifying a subsurface bed of known character, a unit input function, and the sampling technique used for the time-domain filter of FIG. 13;

FIG. 13 diagrammatically illustrates a time-domain filter;

FIG. 14 diagrammatically illustrates the inverse filter for transforming a seismogram into a velocity function of layering over the depth covered by the seismogram;

FIG. 15 illustrates a velocity well logging system; and

FIG. 16 illustrates the system response of the system of FIG. 15 to a step change in formation velocity.

An understanding of conventional seismic exploration will be a most helpful prerequisite to the development of the background theory upon which the present invention is predicated. Therefore, reference will first be had to FIG. 1 which diagrammatically illustrates a conventional seismograph system.

Upon actuation of a blaster 10, a generator of acoustic energy such as a small charge 11 of an explosive, such as dynamite, produces an acoustic pulse. While other forms of seismic wave generators may be utilized, the detonation of an explosive is a wave generator of conventional type. It initiates the travel of seismic waves from the shot point 11 downwardly through the earth strata and also by way of a more or less direct path 12 to the first detector or geophone 13a. The downwardly traveling wave, as along the path 14, is reflected from the upper surface 15 of a relatively thick high velocity bed 16. The reflected wave travels along the path 17 to the detector 13a. Seismic energy also travels by way of a path 18 to a reflection point at the bottom 19 of the bed 16, this energy returning by way of path 20 to the detector 13a. Electrical signals generated by the detector 13a are applied to an amplifier 21 including the usual adjustable filters, and its output, in turn, is applied to a recorder 22.

The amplifier 21 is of the wide band type, that is to say, it to a substantial degree uniformly amplifies the input signals throughout a wide frequency range, for example, from 10–20 cycles per second to 150–200 cycles per second. This range is to be taken as illustrative and not by way of limitation. The amplified output from amplifier 21 is applied to the recorder 22 which produces a seismic record 23. The usual form of this record comprises an elongated strip of photographic paper onto which there has been projected a plurality of light beams to create through exposure of the sensitized paper a plurality of undulating lines or traces corresponding with the electrical signals generated by the detectors, five of which, 13a–13e, have been illustrated. Only one such trace 24 has been illustrated.

There first appears on the trace 24 a pulse 25 at time of zero and corresponding with the instant of detonation of the explosive charge 11. There immediately follows the high amplitude first-break energy 26 (due to the travel of the wave along the path 12) followed by distinctive energy bursts at 27 and 28. The single trace 24 is to some extent idealized, and the distinctive bursts 27 and 28 are representative of the reflection waveforms resulting from the reflection of the seismic energy from the top 15 and bottom 19 of the bed 16. The waveforms 27 and 28 are distinctive in character and stand out in substantial contrast with the remaining portions of the trace 24.

In seismograms obtained in the field, many reflections such as 27 and 28 are likely to be less pronounced and to be somewhat submerged in a background of other reflection energy of high level. In some instances, the reflections 27 and 28 may be obscured and changed in character by reason of multiple reflections arriving at the same time as energy representative of the main event of interest. For example, if seismic energy traversing the path 30 now be considered, it will be seen that it is reflected from a point on the opposite surface 19. From there, it travels by way of path 31 to a point on the upper surface 15. It is then reflected downwardly along path 32 and finally from the lower surface 19 is reflected along a path 33 to the detector 13e.

Seismic energy traversing the path 34 is reflected from a point on the bottom surface 19 to the detector 13e along the path 35. Accordingly, the detector 13e will respond not only to the strong primary event, the energy traversing path 34, but also to a somewhat attenuated secondary event spaced in time by an amount equal to the round-trip travel time (i.e., along paths 31 and 32) of the pulse within the confines of the bed 16.

This is a simplified example of the problems introduced by multiple reflections. When it is considered that there will be a multiplicity of beds and with multiple reflections of energy between each of them, an appreciation of this problem will be more readily grasped.

The production of distinctive waveforms on the seismogram representative of the velocity layering is further complicated by the fact that the apparatus itself is to some extent frequency-selective. This is true in the coupling of the detectors 13a—13e to the earth, and also the fact that filters of various frequency-selective character are in general essential to the production of useful seismograms. Also, the spectrum of the shot pulse and attenuation are variables which contribute to spectral selectivity of the seismogram. The foregoing may be summarized by saying that the field seismogram is extremely useful in the broad sense of disclosing gross characteristics of the layering of the earth, but lacks precision in revealing the details thereof as compared with that obtainable by continuous velocity well logging methods.

Remembering that the burst of energy represented by the waveform 27 has been illustrated as of a distinct character and due to reflection of energy from interface 15, it is now to be observed that the velocity log 29 of FIG. 2 has an abrupt step 29a showing the location of the upper reflecting surface 15 of the relatively thick bed 16. Thus for the waveform 27 on the seismogram, there appears a step 29a on the velocity log 29. While the velocity log 29 is idealized, nevertheless in continuous velocity well logging the interfaces are readily and accurately identified as against the difficulty involved in identifying a corresponding point on the field seismogram, i.e., on the waveform 27. Since in the velocity log 29 the interface or step 29a simulates a step function, it will be seen at once that if the trace 24 can be converted to a sequence of steps corresponding to velocity layers, the new record will have enhanced value. The desirable objective is to convert the waveforms of the field seismogram, the trace 24, to a velocity log.

If the reverse operation be considered for a moment, i.e., the conversion of the step 29a on the velocity log 29 to the waveform 27 representative of a reflection, the underlying philosophy of the present invention will be more readily understood. For example, if there be applied, FIG. 3A, a unit step 51 to a filter 50 which represents the combined effects of the spectrum of the shot pulse, attenuation, and the filtering in the recording system, there will be produced at the output a waveform 52 corresponding with the waveform 27 of FIG. 1. The manner of constructing the filter 50 with the step function 51 for the input and the waveform 52 as the output is well understood by those skilled in the art.

Referring now to FIG. 3B, if the waveform 52 be now applied to an inverse filter 53 which transforms the input pulse 52 back into the step 51, it will be seen that there will have been achieved a method and mechanism by means of which the reflection represented by the waveform 27 may be transformed to a step representative of the interface 29a of the velocity log 29. Having thus established the characteristics of the inverse filter, there are then applied to the input of the inverse filter 53 signals corresponding with the variations of the trace 24 as a whole for the production of the entire velocity log.

There will now be considered the manner in which there is established correlation between a particular waveform as it appears on the trace 24 and the step which appears on a continuous velocity log due to the same velocity contrast in the earth which gave rise to the selected waveform.

In accordance with the invention, it has been found that for a thick bed, such as the bed 16, FIG. 1, there will be on the seismogram a waveform uniquely representing such a bed. With such a reflecting bed identified, there will then be known the representation of its velocity contrast on the velocity log in the nature of a step. This information will be employed in the design of the inverse filter. The identification of a waveform due to a velocity contrast of known character, as for example the deep bed 16 of FIG. 1, is achieved as follows.

The seismogram 24 of FIG. 1 originally recorded or transformed into a phonographically reproducible record is illustrated by the record 36 in FIG. 4. It may be in the form of a variable-area film through which a light beam from a source 37 is directed by way of a slit 38 to a photoelectric cell 39. After amplification by an amplifier 40, the output is applied to a plurality of similar filters, six of them being shown. The filters $F_1$–$F_n$, FIG. 5, are similar to each other in that they have equal band widths, in terms of octaves, but differ from each other in respect to their passbands or mid-frequencies. Each filter is preferably of the type which does not cause any phase shift. The filters $F_1$–$F_n$ may be either electrical, or they may be time-domain, or delay-line filters. One of them, the filter $F_n$, of the time-domain type, will later be described.

The characteristics of the first four filters $F_1$–$F_4$ have been illustrated in FIG. 5 by the graphs $F_a$–$F_d$. At the half-power points through which the broken line 42 has been drawn, the passband for each filter will be an octave wide. For example, for the filter $F_1$, the passband will be from 18 cycles to 36 cycles. For filters $F_2$–$F_4$, the graphs $F_b$–$F_d$ show passbands respectively from 36–72; from 72–144; and from 144–288 cycles per second. In general, while three or four filters will be adequate for the identification of a waveform known to be unique in the terms of the particular subsurface formation it identifies, more or less filters may be utilized. While they have been described as in terms of octave widths at the half-power points, it is to be understood that this arrangement is not a critical one and that there may be overlap as between adjacent filters, and there may also be some frequency separation at the half-power points, as between adjacent filters. The reasons why will appear in the consideration of FIG. 6.

As the phonographically reproducible seismogram 36 is passed in front of the viewing slit 38, the output from each of the filters $F_1$–$F_n$ is applied to a recording camera 41 which may be of the conventional type comprising a galvanometer for each filter for producing new traces on a roll of sensitized paper. Each of the traces on the new record, after development, is examined for a waveform which appears on each of the remaining traces unchanged in amplitude and unchanged in shape except for its time duration. In FIG. 6, there have been illustrated eight waveforms taken from eight traces after reproduction of the seismic record and passage through eight filters having octave widths as indicated by the tabulated values under "f" of FIG. 6. The waveform a of FIG. 6, after passing through the filter having a bandwidth at the half-power point of 13–26 cycles per second, has the greatest duration. The remaining waveforms b–h have the same amplitude as the waveform a, but for each higher octave filter the duration progressively decreases. The waveforms of FIG. 6 as represented at a–h are distinctive in character and it has been found that they are representative of reflections from a bed having characteristics which will now be described with reference to FIG. 1.

The layer 16 of FIG. 1 is taken to be a thick section or bed of relatively uniform velocity. It is sufficiently thick that the reflection of seismic energy giving rise to the waveform of FIG. 6 occurs from a single interface, the top 15, of the section 16. The bed 16 represents an increasing velocity contrast, that is to say, that the velocity of the acoustic energy in the earth is much greater in the section 16 than in the strata above it. It will be seen that waveforms a–h, FIG. 7, are the derivatives of corresponding waveforms, a–h, FIG. 6. If after equal octave filtering there are waveforms on the filtered seismogram which show variations of both characteristics, i.e., FIGS. 6 and 7, then waves of the type shown in FIG. 6 are characteristic and uniquely indicative of the top of a thick bed. The waves varying in the manner shown in FIG. 7 indicate a thin bed. If neither type waves are present on a given record, then the only conclusion that can be drawn is that the reflections are from neither the top of a thick bed or a thin bed and known geology must then be relied upon.

Having uniquely determined that the waveform of FIG. 6 results from reflection off of surface 15 of a thick bed 16, there is immediately known that it corresponds to a step 29a in the velocity log 29. Accordingly, FIG. 3B, the inverse filter 53 will have the characteristics such that upon application of the waveform 52 corresponding with the shape of one of the waveforms of FIG. 6, there will be produced an output 51 in the form of a step. With the inverse characteristics so determined, the corresponding filtered phonographically reproducible seismogram 24 is applied to the inverse filter for production at the output of signals representative of a velocity log. The manner in which the foregoing steps are carried out will be presented in detail after further discussion of alternative waveforms which may be utilized and which uniquely determine other subsurface formations which may be utilized to establish the design of the inverse filter to transform the seismogram into a velocity log.

As above noted, waveforms appearing in FIG. 7 are characteristic of thin reflecting beds, i.e., those which exhibit a strong or marked velocity contrast with the layers above them and below them. The waveforms from thin reflecting beds are, it will be noted, the derivatives of the waveforms of FIG. 6 representative of thick reflecting beds but they differ in amplitude and in time duration. Waveforms exhibiting the characteristics of those of FIG. 7, if appearing on the record along with those of FIG. 6 obtained from the recording camera 41 after passage through the filters $F_1$–$F_n$, may be utilized for the design of the inverse filter 53, since they are representative of a thin reflecting bed and one which produces on the velocity log 29 a feature such as a spike representative on such log of a thin reflecting bed.

There will likely appear on the traces from the recorder 41 a plurality of waveforms like those shown in FIG. 8. At h, FIG. 8, there are two distinct waveforms spaced one from the other. These are due to reflections from the upper and lower boundaries of a high velocity layer having a thickness, in terms of time-spacing, equal to one-half the distance between the pulses. If the traces are examined from the filters with lower frequency passbands, it will be observed that the distinctive waveforms merge together, making difficult the identification of the velocity layering on the low frequency filters. Thus the selection of a distinctive waveform like those appearing in FIG. 8 will in general be avoided, though the possibility remains that they may be utilized where their source in terms of the feature appearing in a velocity log can be ascertained. The nature of the feature of the velocity log corresponding with waveforms like those of FIG. 8 will be known where well-bore velocity logs have been taken in the same general area. However, in the absence of well-bore velocity logs for the area, distinctive waveforms, such as appearing in FIGS. 6 and 7, may be utilized in the determination of the character of the inverse filter 53, FIG. 3B, to be used to convert the seismogram to a velocity log.

The waveforms of FIG. 8 are representative of those which confront the seismologist in his analysis of a large portion of the field seismograms regardless of the filtering which has taken place either in the field or in reproductions of the field seismograms for the reason that the velocity layers will vary widely in thickness, and thus there will always be reflection events represented on a seismogram by waveforms which have merged together, making virtually impossible their identification with any degree of accuracy. In accordance with the present invention, there is utilized a waveform of unique character in conjunction with the unique velocity feature which produces it to transform the seismogram as a whole into a velocity log so that the layering which gives rise to obscure waveforms, such as FIG. 8, appear on the velocity log as readily identifiable velocity features and thus facilitate their identification.

Reference has already been made to the fact that the filters $F_1$–$F_n$ may take various forms. It is again emphasized that the seismogram which is utilized preferably has a wide frequency band, and at least as wide as the total frequency range covered by the equal octave filters.

Referring now to FIGS. 9 and 10, there has been disclosed a time-domain filter $F_n$ which may be utilized as the filter of the same designation in FIG. 4. Though there may be utilized filters $F_1$–$F_5$ which are duplicates of the one shown in FIG. 9, it will be more economical to utilize the filter $F_n$ of FIG. 9 for the performance of each of the filtering operations indicated by the filters $F_1$–$F_n$. As will later be shown, the time-domain filter $F_n$ provides the desired differing passbands by merely changing the speed of operation of a motor 60 as by a speed-adjusting means represented by a control arm 61.

As shown in FIG. 9, the time-domain filter $F_n$ comprises a drum 62 carrying a magnetic recording medium, such as a magnetic tape 63. A recording head 64 of conventional design records on tape 63 the output signals from the amplifier 40. A series of pickup heads, the five heads 65–69 being shown, are spaced along the path of the tape 63 by distances determined as later set forth herein. An erase head 70 energized in conventional manner from a source 71 serves to remove from the tape 63 the signal recorded at the head 64. The circuits between each pickup head and a summing circuit 72 are identical. The circuit from pickup head 65 includes a reversing switch 73a and an amplifier 74a which is provided with a potentiometer 75 for selection of a desired proportion of the signal developed at the output of the amplifier 74a. The components of the corresponding circuits have corresponding reference characters with different subscripts added for each circuit. The subscript "$n$" for the circuit from pickup head 69 is indicative of the fact that any desired number of circuits may be employed. This same convention has already been used for the filter $F_1$–$F_n$ of FIG. 4, and it will be used again.

The spacing of the pickup heads, the positions of the reversing switches, the setting of the output potentiometers, and the speed of rotation of the drum 62 are matters within the knowledge of those familiar with time-domain filtering. Because time-domain filtering involves the convolution of two functions, it can be performed with electrical or magnetic delay lines and by digital computing techniques.

In FIG. 9 the arrangement is essentially a magnetic-drum delay line which is adjusted in accordance with the desired impulse response of the needed filter. The performance of a time-domain filter is precisely determined by its impulse response, the latter being as definitive of its response as the amplitude and phase characteristics under steady-state conditions determine the response of an electrical filter.

Referring now to FIG. 10, the impulse response 77 for the filter $F_n$ is shown with time as abscissae and amplitude as ordinates. The impulse response 77 is for a filter having a bandpass of from 36 to 72 cycles per second. Below the impulse response 77 is a plot representative of a simplified sampling technique.

The samples have been taken at the positive and negative peaks of each leg in the impulse response 77. The spacing between samples in FIG. 10 is satisfactory because that spacing is less than half the duration of the shortest pulse in the input signal. Where it exceeds that amount, more pickup heads will be used and the samples will be taken at closer intervals which will be equally time-spaced one from the other.

In FIG. 9, the potentiometer 75 is set to correspond with the amplitude $K_1$ at the first sampling point. The pickup head 66 is time-spaced from the pickup head 65 by a distance $d_{12}$ equal to the time spacing between $K_1$ and $K_2$. Similarly, the potentiometers of amplifiers $74b$–$74n$ are set in accordance with the amplitudes $K_2$ to $K_5$ at the sampling points, and the pickup heads 67–69 are spaced apart by the corresponding amounts $d_{23}$, $d_{34}$, and $d_{45}$.

With the time-domain filter $F_n$ adjusted in the foregoing manner, the seismic record to be filtered as appearing on the phonographically reproducible record 36 is driven past the slit 38. The output from the photo-cell 39 and amplifier 40 is then applied by conductor 79 to other time-domain filters, where used, and to the recording head 64. After the electrical signals have been recorded by the head 64 on the tape 63, they are detected in succession by the pickup heads 65–69 and after amplification and attenuation as above described are applied to a summing circuit 72. The summing circuit 72 is shown schematically as including a vacuum tube 72a having a coupling resistor extending from its input or grid circuit to the output of each of the amplifiers 74a–74n. A recording camera 41 is shown driven by the cathode output circuit of the tube 72a.

With the drum speed, spacings and potentiometers established, as above described, the input signal will be modified by the time-domain filter having a passband between 36 to 72 cycles per second. After the length of the record 36 has been moved past the slit 38, and a record made of the output of the filter $F_n$, the speed of motor 60 is adjusted as by the lever 61 to provide a different speed of movement of the tape past the heads 64–70. The magnetic tape, after passage in the direction of rotation beyond the erase head 70, is free of any recorded signals and ready for the next filtering operation. The required speeds of operation are readily determined from the differences to be established between the mid-frequencies of each filter passband.

Although the arrangement of FIG. 9 has been described at length because representing a preferred filtering system, other types of filtering of the seismic record may be utilized in the determination of waveforms which provide unique correlation between a reflection on a seismogram and a corresponding feature on a velocity log.

There will now be presented a further discussion of background theory as well as a description of how there is obtained the impulse response required for the inverse filter of FIG. 3B. It is within the scope of the present invention to calculate the inverse function by using a digital computer, an electrical or magnetic delay line, or a time-domain filter. That these various approaches are suitable will be evident from a brief consideration of filter theory.

If, in FIG. 3A, an input signal $e(t)$ is passed through the filter 50 with a resultant output signal $c(t)$, the output signal may be expressed as the result of convolving the input signal with the impulse response of the filter. The foregoing may be mathematically stated as follows:

$$c(t) = \int_0^t e(\tau) g(t-\tau) d\tau \qquad (1)$$

where:

$g(t)$ characterizes the filter F and is called the impulse response of the filter, and $\tau$ (tau) is the time variable of the integration.

Convolution in the time-domain transforms into multiplication in the frequency-domain. Therefore, the expression (1) may be written:

$$C(s) = E(s) G(s) \qquad (2)$$

where:

$$E(s) \triangleq \int_0^\infty e(t) e^{-st} dt \qquad (3)$$

$$G(s) \triangleq \int_0^\infty g(t) e^{-st} dt \qquad (4)$$

$$C(s) \triangleq \int_0^\infty c(t) e^{-st} dt \qquad (5)$$

By definition $\triangleq$ means identically equal to, and $s = \sigma + j\omega$; a complex expression of frequency where $\sigma =$ real part of $\{s\}$, and where $\omega = 2\pi f$, with $f$ in cycles per second.

Where a digital computer is utilized, Equations 1, 3, 4, and 5 will be applicable.

For the time-domain filter described in FIG. 9, the problem was to obtain the output wavefrom, knowing the input and the filter response corresponding with the particular bandpass desired. The same problem is present in FIG. 3A where the input waveform 51 is known and the filter response is known for the production of the output waveform 52.

For the inverse filter 53 of FIG. 3B, the problem is different. The input function 52 and also designated as $E(s)$, Equation 3, is known, as is output function $C(s)$, Equation 5. The problem is to obtain the impulse response $G(s)$ of the inverse filter 53 which will produce the output step function 51 or $C(s)$. The foregoing may be stated mathematically by rewriting Equation 2 as follows:

$$G(s) = \frac{C(s)}{E(s)} \qquad (6)$$

Equation 6 is easily solved in the frequency-domain and has the following inverse transform:

$$g(t) = \frac{1}{2\pi j} \int_{\sigma-j\infty}^{\sigma+j\infty} G(s) e^{st} ds \qquad (7)$$

The inverse transform, Equation 7, is utilized to obtain the waveform of $g(t)$.

Further in connection with the use of the digital computer, the impulse response of the inverse filter 53, FIG. 3B, is obtained by dividing the spectrum of the output signal $C(s)$ by the spectrum of the input signal $E(s)$ and subtracting the phase difference, if any, to obtain the frequency transform of the inverse filter. The solution of the inverse transform, Equation 7, provides the information needed to obtain the impulse response of the filter 53, which filter will then transform the input waveform 52 to the desired output waveform 51.

In the system illustrated in FIG. 13, the impulse response for the inverse filter 53 is obtained directly by utilizing a sampling technique in the time-domain which is quite similar to the sampling technique already described in connection with FIG. 9. For the purpose of the system of FIG. 13, the following equation is utilized as an approximation of Equation 1:

$$C(n\Delta) = \Delta \sum_{m=0}^{n} e(m\Delta) g([n-m]\Delta) \qquad (8)$$

where the waveforms representing the input signal $e(t)$ and the output signal $c(t)$ are represented by a series of equally spaced samples having the amplitudes respectively illustrated in FIGS. 11 and 12. The time spacing of the samples is $\Delta$ and the total number of samples is $(n+1)$. The various sample amplitudes in the input signal, FIG. 11, are denoted as $a$, with appropriate subscripts, and the various amplitudes of the impulse response are denoted as $b$ with appropriate subscripts. Mathematically, the foregoing can be stated:

$$a_m = e(m\Delta) \qquad (9)$$

where $m = 0, 1, 2 \ldots n$.

$$b_{n-m} = g[(n-m)\Delta] \qquad (10)$$

where $m = 0, 1, 2 \ldots n$, and $n = 0, 1, 2, \ldots n$.

It will now be seen it is possible to solve the equations for the $b_m$ amplitudes necessary to devise the inverse filter 53 using sample values of the input signal 52 and sample values of the output signal 51. The input signal 52 has been reproduced in FIG. 11, and the output signal 51 in FIG. 12. The output signal 51, or as mathematically represented by $c_m$, is everywhere equal to unity after time occurrence of $C_0$. Prior to time occurrence of $C_0$, the output is zero. The input amplitudes ($a_m$) are obtained from the input signal 52 which is representative of the pulse 27 selected from the trace 24 of the seismogram 23. The various $b_m$ coefficients may now be computed as follows:

$C_0 = 1 = a_0 b_0$ ---------------- for $n=0$ (11)
$C_1 = 1 = b_0 a_1 + b_1 a_0$ ---------------- for $n=1$ (12)
$C_2 = 1 = b_0 a_2 + b_1 a_1 + b_2 a_0$ ---------------- for $n=2$ (13)
$C_n = 1 = b_0 a_n + b_1 a_{n-1} \ldots + b_{n-1} a_1 + b_n a_0$ ---------------- for $n=n$ (14)

Referring now to FIG. 11, an arbitrary amplitude is established for $a_0$. This value will conveniently be assumed to be unity; such an assumption is proper since $a_0$ merely defines the gain of the filter network. The value $a_0$ is obtained at the time interval $\Delta$ following the origin of the waveform 52. The subsequent values of $a$ will be spaced apart by the time interval $\Delta$. Hence, all values of input amplitudes $a_m$ are known from the waveform of FIG. 11. It will be observed that the values of $a_m$ are taken at much shorter intervals of time than were the positive and negative peak samplings K of FIG. 10.

Again referring to Equation 11, if $a_0$ is unity, then $b_0$ is equal to unity. Reference may now be had to Equation 12 where it will be noted all values are now known except $b_1$. The equation is readily solved for $b_1$. Similarly, Equation 13 and the intervening equations are solved, the general form 14 of the equation being presented to take care of any desired number of samples $n$. In FIGS. 11 and 12, $n$ is equal to 20.

There has been illustrated in FIG. 13 a system for progressively obtaining the $b_m$ vlaues necessary to define the impulse response of the inverse filter 53 of FIG. 3B. The system of FIG. 13 broadly comprises a time-domain filter and includes a recording medium 80 of the phonographically reproducible type and illustrated as a magnetic tape. A recording means or head 81 is arranged to place on the record 80 a signal applied by way of a conductor 82. Serially connected to one end of conductor 82 are a starting switch 90, a variable resistor 91, and a source of voltage 92 shown as a battery.

A plurality of sensing devices or pickup heads 83a—83n are associated with the magnetic tape 80 for producing in their respective output circuits signals representative of the record on the tape as it passes each of the devices $83a$—$83n$. The signals detected by the pickup head $83a$ are fed through a reversing switch $84a$, an amplifier $85a$ and a potentiometer $86a$ to a summing circuit $88$ which which includes a resistor $87a$ and a vacuum tube shown as a triode $88a$. The output from the summing circuit $88$ is applied by way of conductors $93$ and $82$ to the recording head $81$.

The operation of the system of FIG. 13 provides a solution for Equations 8 through 14 and produces by means of a recorder on its record chart the impulse response characteristic $96$ of the inverse filter $53$ of FIG. 3B. The recorder $94$ may be of the type known as a high-frequency oscillographic recorder. Such recorders include an amplifier $97$. The input circuit of the amplifier $97$ is connected to a pickup head $98$ associated with the magnetic tape $80$.

The voltage of the battery $92$ and the setting of the variable resistor $91$ are such as to apply through the circuit $82$ to the recording head $81$ an input signal or voltage representative of unity. This voltage of unity value corresponds with the $c_m$ values shown in FIG. 12 as $c_0, c_1, c_3 \ldots c_n$ and which, as already noted, all have values of unity. It will be recalled that the value selected for the $a_0$ value is also unity. Though other values can be utilized for $a_0$, its selection to correspond with unity is useful, as will now be shown.

Referring now to Equation 11, it will be remembered that $a_0$ by definition has a value of unity and, FIG. 11, has a negative value. Accordingly, $b_0$ is equal to $-1$, being the coefficient of the left-hand side of Equation 11 divided by $a_0 = -1$. With a motor $99$ energized to drive the tape $80$ at a selected speed, the switch $90$ is closed to apply through the recording head $81$ a voltage of polarity and magnitude corresponding with $b_0 = -1$.

When this recorded signal arrives at the pickup head $83a$, a corresponding voltage is applied by way of the reversing switch $84a$ to the amplifier $85a$. The spacing between the recording head $81$ and the pickup head $83$ corresponds with the spacing $\Delta$ of FIG. 11. The foregoing requirement establishes the correlation between the speed of the tape $80$ and the spacing between the recording head $81$ and the pickup head $83a$. Since the value of $a_1$, FIG. 11, is negative, the reversing switch $84a$ occupies a position to apply a negative signal to the amplifier $85a$. The gain of that amplifier or the fraction of the output thereof as established by the potentiometer $86a$ corresponds in magnitude with that of $a_1$. In terms of Equation 12, there will be produced on the coupling resistor $87a$ of the summing circuit $88$ a voltage corresponding with the product of $b_0 a_1$. Since there are no other signals on the tape $80$, there is no response from the remaining pickup heads. Accordingly, the product $b_0 a_1$ is applied by way of the output circuit $93$ to the input circuit $82$ of the recording head $81$ where it is algebraically subtracted from the unit voltage derived from source $92$. Thus, there has been provided a solution of Equation 12 which by inspection can be rewritten as follows:

$$b_1 = \frac{1 - b_0 a_1}{a_0} \quad (15)$$

The pickup head $83b$ is spaced from the head $83a$ by a distance corresponding with the time interval $\Delta$ of FIG. 11. Accordingly, when the tape $80$ has moved through a second distance $\Delta$, the signal representing $b_0$ will be applied by way of the reversing switch $84b$ to the amplifier $85b$ and thence to the coupling resistor $87b$ of the summing circuit $88$. The amplifier $85b$, together with its potentiometer $86b$, will provide a gain corresponding with the value of $a_2$. Thus, there will be produced at the coupling resistor $87b$ the product of $b_0 a_2$, the first term on the right-hand side of Equation 13. Meanwhile, a signal representative of the value of $b_1$ will have been recorded on the tape $80$ by the recorder head $81$, and as it arrives at the pickup head $83a$ there will be performed a multiplication of $b_1 a_1$ which corresponds with the second term of Equation 13. The algebraic sums of these two terms will be applied from the output of the summing circuit by way of conductor $93$ to the input circuit $92$ for the further algebraic subtraction indicated and to record by the head $81$ on tape $80$ a signal corresponding with the value of $b_2$.

As the tape $80$ is moved through successive incremental distances corresponding with the time interval $\Delta$ of FIG. 11, solutions for the successive equations will be obtained, these being, in summation, a solution of Equation 8 for the term $g(n-m)\Delta$. It is the foregoing $g$-term which defines the impulse response of the inverse filter $53$ of FIG. 3B. As indicated in FIGS. 11 and 12, there will be twenty such equations, the general form being given in Equation 14, the subscripts $n$ being utilized both in the general form of that equation and also in identifying the circuit elements for the last pickup channel extending from the pickup $83n$.

For $n = 20$ or for other selected time spacings of $\Delta$, along the waveforms of FIGS. 11 and 12, the pickup head $98$ applies to the amplifier $97$ of the recorder $94$ input signals representative of the desired solution of Equation 8 which appears on the record chart $95$ as a trace with varying amplitude in the direction of one coordinate against time as the other coordinate, the chart $35$ being driven by the motor $99$ at uniform speed and by way of a mechanical connection $100$. Following the pickup head $98$, erasing head $101$ with conventional associated energizing means $102$ serves to remove from the tape $80$ the record applied thereto by the recording head $81$.

Referring now to FIG. 14, the impulse response $96$ on the record chart $95$ has been reproduced in association with a system having circuits and circuit components and apparatus like those of the system of FIG. 13. The system of FIG. 14 when adjusted in the manner now to be described comprises the inverse filter $53$. Like FIG. 13, a mtor $99$ drives a magnetic tape $80$ and it also drives a recorder chart $95$ of a recorder $94$. There are provided a plurality of pickup heads $83a$, $83b$, $83n$ corresponding in number with the time spacing $\Delta$, taken along the time coordinate of the impulse response $96$. The $a$-values along the impulse response $96$ determine the setting of the gain controls $86a$—$86n$ for the amplifiers $85a$—$85n$, reversing switches such as $84a$ of FIG. 13 being included in the amplifier $85a$ and set to correspond with the polarities of the magnitudes of the $a$-values. The spacing between the pickup heads $83a$—$83n$ will again correspond with $\Delta$.

The number of pickup heads $83a$—$83n$ in general will be larger than the number employed in the system of FIG. 13. It is desirable that the entire duration or length of the impulse response of the inverse filter be represented in increments of $\Delta$. For some operations as few as 20 such pickup heads may be adequate. However, in general considerably more will be required. The number may be such that the use of an analogue system would be unduly cumbersome, dictating the desirability of carrying out in a digital device the operations diagrammatically represented by the simplified system of the drawings. For example, in one operation wherein a seismic signal type function was treated by an inverse filter to produce a velocity log type function, 540 points or pickup stations were employed in order to retain and restore frequency components from about zero frequency to over 500 cycles per second. Where fidelity of this order is not required, fewer pickup points may be required to produce a velocity log-like function. In carrying out such filtering operation, a digital computer was employed.

With a seismogram including a trace such as illustrated at $24$, FIG. 1, in phonographically reproducible form on the magnetic tape $80$ of FIG. 14, the inverse filtering thereof will then take place as it is moved past the pickup heads $83a$—$83n$. These pickup heads have their respective amplifiers connected to a summing circuit $88$ with the output thereof applied to the recorder $94$. There are produced on the chart $95$ the results of the inverse filtering of the seismogram, and as previously explained, the resultant record is representative of the velocity layering represented in the seismogram. The new record approximates that of a log of bore-hole velocity.

In the foregoing description, the reference characters of FIG. 13 were used in the description of FIG. 14, since a single system can be used to perform the several time-domain filtering requirements described at length in connection with FIGS. 4, 9, 13 and 14.

The method of carrying out the present invention as above-described has been based upon empirical procedures to provide an inverse filter of desired characteristics, namely, by applying a series of tests to a given reflection waveform to determine the character of the subsurface interface from the seismic waves represented by the chosen reflection waveform.

In accordance with another mode of carrying out the present invention, the amplitude of the first break energy 26, FIG. 1, may be employed. More particularly, it will be recognized that all elements of the system having any effect upon the impulse 26 may be considered to be the primary distortion elements of the entire seismic exploring system. If this is the case, the impulse 26 may be considered to characterize the distortion of the system. In contrast, the remainder of the seismogram may be considered to represent earth layering.

More particularly, the detonation of charge 11 will produce a pressure change in the shothole which is in the form of a unit step function or a unit impulse (either of which may be similarly treated). Immediately surrounding the charge 11 the resultant pressures may exceed the elastic limit, causing non-linear transmission of the acoustic pulse to the earth formations over at least a portion of the path 12. Therefore, there will be some non-linearity in transmission. The coupling or the plant of the detector 13a generally is considered to be frequency-selective. Amplifier 21 is likewise frequency-dependent as is the recorder 22.

In accordance with this second mode of carrying out the invention, the impulse 26 is considered to be the impulse response of the generation, detection and recording components of the seismic exploring system. Therefore, the inverse filter as above-detailed will be selected as to have an impulse response the inverse of the waveform 26. By this means, the empirical steps comprising comparison between a given waveform after filtering as described in connection with FIGS. 6, 7, and 8 may be eliminated since each seismogram will have recorded thereon a key waveform (26) which inherently provides a basis for a proper inverse filter.

It will be recognized that the waveform upon which the inverse filter is based may be unique for each shot or even for each plant of detector 13a. However, since the reflection signals 27 and 28 pass through the same distortion elements as the impulse 26, a positive basis is provided for filtering the seismogram as a whole in order to produce a velocity log from a single point observation on the surface of the earth and without necessity of providing a drill hole.

The latter mode of carrying out the present invention is described and claimed in the application of Philip L. Lawrence entitled First Break Control Inverse Seismic Filtering, Serial No. 668,546, filed June 27, 1957.

Now that the invention has been described in connection with seismic exploration, it should be understood that the same methods and systems may be employed in connection with other geophsyical methods such as radioactive well logging, electric well logging, and acoustic velocity well logging. In FIG. 15, there is illustrated a single receiver acoustic velocity well logging system comprising a transmitter 100 and a detector 101. Transmitter 100 and detector 101 are interconnected by an acoustic insulator type coupling 103 and supported for movement along the well bore by means of a cable 104. Acoustic pulses are periodically generated by transmitter 100 and the resultant pulse is detected by receiver 101 after traveling as along path 105.

Since the transmitter 100 and receiver 101 are spaced apart, the response to changes in formation velocity which occur over an interval shorter than such spacing will not be sharp but will comprise a transition such as represented by the dotted curves 106 and 107, FIG. 16. The solid curves represent in somewhat idealized form the transitions in velocity at boundaries 108, 109, and 110. Thus, the dotted curve 106 may represent the unit impulse response of the logging system. The dotted segment 107 represents the step function response of the logging system. In the case of velocity well logging, such responses may be determined from a knowledge of the geometry of the system. Thus, a log which includes variations such as represented by the dotted segments 106 and 107 may be filtered by a filter having a characteristic the inverse of that represented by curves 106 or 107 so that the sharp characteristics of the solid curves of FIG. 16 may be restored.

In electrical well logging, the response of various electrode configurations is well-known to those skilled in the art, and, thus, electric well logs may be filtered in accordance with the present invention to reduce to a more accurate representation of subsurface lithology the oscillations obtained through field well logging procedures.

From the foregoing it will be seen that there is provided a method for geophysical exploration in which there is generated as a dependent variable a function controlled by an earth characteristic, which function is characterized by variations with respect to an independent variable at points where the earth characteristic presents a step-like change, which variations are representative of the impulse response of the system employed for generating the function. A signal representative of the function is then passed through a second system which is characterized by an impulse response the inverse of the impulse response of the system above employed to render the waveform more representative of the earth characteristic and more free from system distortion.

Now that the underlying principles of the present invention have been explained in conjunction with systems illustrative of how the invention may be practiced, it will be readily understood how other apparatus may be utilized to carry out the various needed operations. The applicability of electrical delay lines and magnetic delay lines will be obvious to those skilled in the art. The applicability of the digital computer of conventional design but programmed to operate as a time-domain filter, as explained in connection with FIGS. 4, 9, 13, and 14, will be self-evident from the following considerations. The sampling technique utilized in establishing the $a$-values for $n\Delta$ sampling lends itself particularly well to the use of the digital computer. Such computers presently available on the market make possible on a more economical basis utilization of a relatively large number of samples as compared with the number of pickup heads required to yield a degree of resolution of a higher order than the twenty which have been referred to above.

While the invention has been described in connection with certain specific embodiments thereof, it will now be understood that further modifications will suggest themselves to those skilled in the art; and it is intended to cover such modifications as fall within the scope of the appended claims.

What is claimed is:

1. In the interpretation of seismograms on which subsurface velocity features appear as waveforms of differing character, the method which comprises progressively applying to the seismogram as a whole filtering the inverse of that required to transform a step-like function to a waveform distinctively representative of a subsurface layer of known character, and recording the modified seismogram against a time base related to that of said first-named seismogram to produce a seismographic record on which step-like subsurface velocity features appear as step-like functions.

2. In the interpretation of seismograms on which subsurface velocity features appear as waveforms of differing character, the method which comprises selecting from said waveforms one which is uniquely representative of a subsurface layer of known character, applying to the seismogram as a whole inverse filtering for modifying the waveforms on the seismogram as a whole by said inverse filtering which transforms said selected waveform to a step-like function, and progressively recording the modified waveforms of said seismogram against a time base related to said first-named seismogram to produce an interpretative record on which subsurface velocity features appear as step-like functions.

3. In the interpretation of seismograms on which subsurface velocity features appear as waveforms of differing character, the method of identifying on the seismogram a waveform uniquely representative of a subsurface velocity feature of known character, which comprises modifying said waveforms by filtering them a plurality of times with bandpass filters about an octave wide and disposed along a frequency band extending from about 10 to about 200 cycles per second, and recording said waveforms after each filtering thereof for display of waveforms known uniquely to represent subsurface velocity features of known character by inspection of the changed character of certain of said waveforms by said multiple filtering thereof.

4. The method of claim 3 in which a signal representative of a selected waveform uniquely representative of a subsurface velocity feature of known character is applied to an inverse filter to produce therefrom a step-like function of character uniquely representative of the subsurface velocity feature as appearing on a velocity well log, and thereafter applying the same inverse filtering to the seismogram as a whole to produce therefrom step-like functions against a time base related to that of the seismogram representative of the waveforms appearing on the seismogram which are likewise representative of said subsurface velocity features.

5. The method of converting a seismogram to a velocity log which comprises applying to a filter electrical signals representative of that part of the seismogram which is known uniquely to represent a subsurface velocity feature of known character, adjusting the filter for production at its output of an electrical signal identical with that of a velocity feature as appearing on a well bore velocity log for identification of the same distinctive subsurface layer, and thereafter applying to said filter electrical signals representative of the seismogram as a whole to produce a velocity log therefrom.

6. In the interpretation of seismograms on which subsurface velocity features appear as complex waveforms resulting from reflection of seismic energy from subsurface velocity features and as modified by multiple reflections between subsurface velocity contrasts, the method which comprises progressively applying to the seismogram as a whole inverse filtering which transforms from the seismogram a waveform distinctively representative of a subsurface velocity feature of known character to a step-like function, and recording against a time base related to that of said seismogram said step-like functions.

7. In geophysical exploration the method which comprises generating as a dependent variable a function controlled by an earth characteristic which function is characterized by variations with respect to an independent variable at points where said earth characteristic presents a step-like change and which function includes a representation of the impulse response of the system employed for generating said function, passing a signal representative of said function through a second system which is characterized by an impulse response the inverse of said first-named impulse response to render said signal more representative of said earth characteristic and more free from system distortion.

8. In seismic exploration the method which comprises generating a seismic signal controlled by earth velocity layering which signal is characterized by variations with respect to time which represent points where said velocity layering presents a step-like change as the impulse response of the seismic system employed for generating said seismic signal, passing said seismic signal through a second system which is characterized by an impulse response the inverse of said first-named impulse response to render said signal more representative of said velocity layering and more free from system distortion.

9. A system for transforming a geophysically dependent variable function into a function more representative of the geophysical condition upon which said function is based comprising means for producing an impulse response $g([n-m]\Delta)$ of an inverse filter which will transform said function to a step function $C(n\Delta)$, said means including computer means for solving the following equation:

$$C(n\Delta) = \sum_{m=0}^{n} (a_m) g([n-m]\Delta)$$

where said impulse response is the inverse of one corresponding with a waveform selected from said geophysically dependent variable function, and means for applying in succession to said computer means signals having amplitudes representative of said $a_m$ values and signals representative of said $C(n\Delta)$ values and including a summing circuit, said computer means having an output circuit from which there are obtained output signals representative of the solution of $n$ number of equations of the foregoing type, where $n$ is equal to the number of amplitude samples taken from said function.

10. A seismic filter for transforming seismograms into step-like functions comprising means for producing an impulse response $g([n-m]\Delta)$ of an inverse filter which will transform a selected waveform of said seismogram to a step function $C(n\Delta)$, comprising means for solving the following equation:

$$C(n\Delta) = \sum_{m=0}^{n} (a_m) g([n-m]\Delta)$$

said means comprising a computer, where said impulse response is the inverse of one corresponding with a waveform selected from said seismogram, and means for applying in succession to said computer signals having amplitudes representative of said $a_m$ values and signals representative of said $C(n\Delta)$ values and including a summing circuit, said computer having an output circuit from which there are obtained output signals representative of the solution of $n$ number of equations of the foregoing type, where $n$ is equal to the number of amplitude samples taken from said waveform.

11. A seismic filter for use in conjunction with a waveform uniquely representative of a subsurface velocity feature of known character having at time-spaced intervals $\Delta a$ plurality of amplitudes $a_m$ comprising means for producing the impulse response $g([n-m]\Delta)$ of an inverse filter which will transform said waveform to a step function $C(n\Delta)$, comprising means for solving the following equation:

$$C(n\Delta) = \sum_{m=0}^{n} (a_m) g([n-m]\Delta)$$

said means comprising a computer, and means for applying in succession to said computer signals having amplitudes representative of said $a_m$ values and signals representative of said $C(n\Delta)$ values and including a summing circuit, said computer having an output circuit from which there are obtained output signals representative of the solution of $n$ number of equations of the foregoing type, where n is equal to the number of amplitude samples taken from said waveform.

12. The method of analyzing a field seismogram for identification of obscure velocity layers in the earth which comprises progressively applying to the seismogram as a whole the same inverse filtering required to transform to a step-like function a waveform distinctively representative of a subsurface layer of known character and recording the results of said inverse filtering.

13. In the interpretation of seismograms on which subsurface velocity features appear as waveforms of different character, the combination which comprises means for progressively applying to the seismogram as a whole filtering the inverse of that required to transform a step-like function to a waveform distinctly representative of a subsurface layer of known character, and means for recording the modified seismogram against a time base related to that of said first-named seismogram to produce a seismographic record on which step-like subsurface velocity features appear as step-like functions.

References Cited in the file of this patent

UNITED STATES PATENTS

| | | |
|---|---|---|
| 2,355,826 | Sharpe | Aug. 15, 1944 |
| 2,632,057 | Koenig | Mar. 17, 1953 |
| 2,794,965 | Yost | June 4, 1957 |
| 2,916,724 | Peterson | Dec. 8, 1959 |

OTHER REFERENCES

Wadsworth et al.: "Geophysics," July 1953, pages 539–586.

Peterson et al.: "Geophysics," July 1955, pages 516–538.

Jones et al.: "Geophysics," October 1955, pages 745–765.